W. H. WEINGAR.
ANGLE BLOCK.
APPLICATION FILED FEB. 25, 1920.
1,428,509.
Patented Sept. 5, 1922.
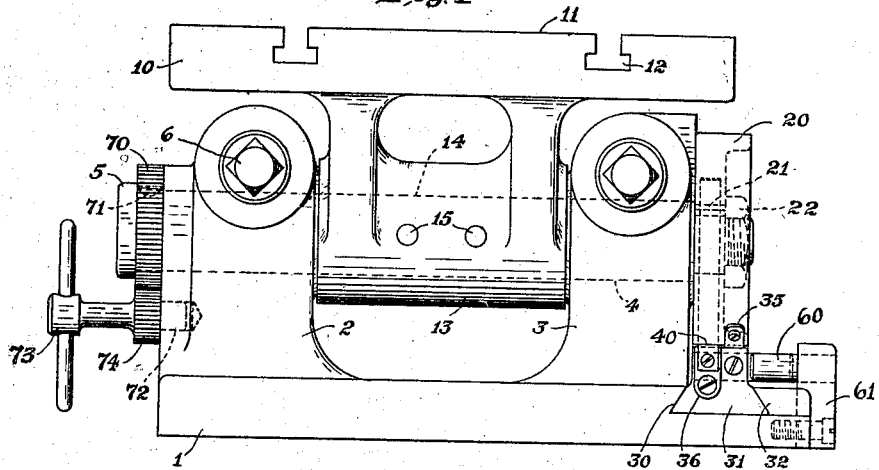
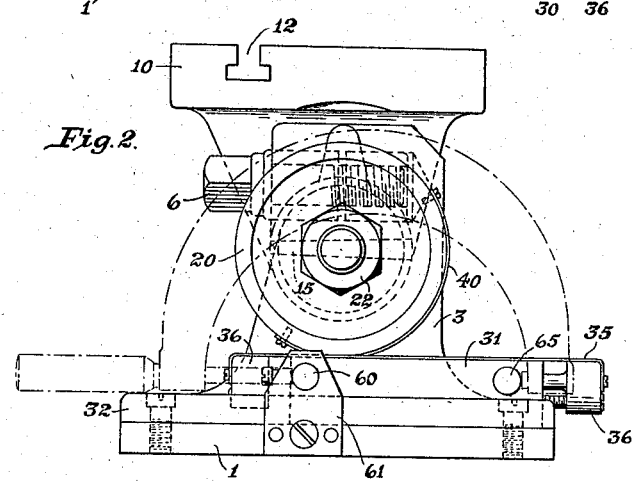
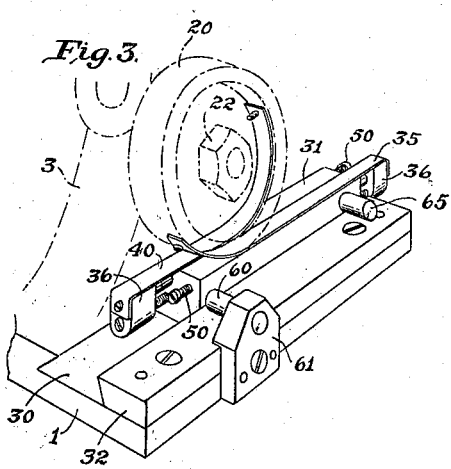
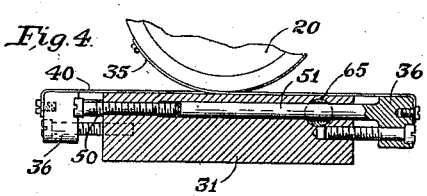
Inventor
William H. Weingar
By S. Jay Teller
Attorney.

Patented Sept. 5, 1922.

1,428,509

UNITED STATES PATENT OFFICE.

WILLIAM H. WEINGAR, OF WEST HARTFORD, CONNECTICUT, ASSIGNOR TO PRATT & WHITNEY COMPANY, OF NEW YORK, N. Y., A CORPORATION OF NEW JERSEY.

ANGLE BLOCK.

Application filed February 25, 1920. Serial No. 361,366.

*To all whom it may concern:*

Be it known that I, WILLIAM H. WEINGAR, a citizen of the United States, residing at West Hartford, in the county of Hartford and State of Connecticut, have invented certain new and useful Improvements in Angle Blocks, of which the following is a specification.

This invention relates to an angle block or attachment, particularly one adapted for use in connection with a planer, shaper, milling machine or other similar machine, or for use in inspecting the angles between parts of machined articles.

The objects of the present invention are to provide a suitable angle block or fixture which may be conveniently mounted on the table of a planer or other machine and permit one of its surfaces to be tilted or adjusted to any desired angular position and rigidly clamped therein.

A further object of the invention is to provide means to determine the angle to which the fixture is adjusted with a high degree of precision, and further, to provide an attachment or fixture which will be simple, durable and one not easily put out of order.

Another object of the invention is to provide an angle attachment which may be conveniently used for inspecting angles between parts of articles after they have been machined, in which case the attachment is used independently of any machine.

In the drawings I have shown an embodiment of the invention which I now deem preferable, but it is to be understood that changes and modifications may be made within the scope of the appended claims without departing from the spirit of the invention.

In the figures annexed hereto and forming a part of this specification:

Figure 1 is a longitudinal view in elevation of the complete angle attachment and indicating mechanism therefor.

Fig. 2 is an end view of the attachment more clearly showing the indicating means.

Fig. 3 is a perspective view of the indicating means in one of its adjusted positions.

Fig. 4 is a sectional view in elevation of a part of the indicating means.

In its entirety the present invention comprises the following principal parts, namely; first, a base plate; second, an angle member tiltably mounted about a shaft mounted in the base plate; third, a slide mounted in the base plate and movable in a direction at right angles to the axis of the shaft about which the angle member is mounted; and fourth, connections between the angle member and slide whereby a given movement of the slide indicates a definite angular movement of the angle member.

Referring now more particularly to the accompanying drawings in which I have shown the preferred embodiment of the present invention, 1 refers to the base plate or member suitably finished on its lower surface for engagement with the table of a planer or other machine tool. The base plate or member 1 is provided with a pair of suitable uprights or pedestals 2 and 3 horizontally bored as shown at 4 to contain a short shaft or pin 5. Preferably the uprights 2 and 3 are split at their upper or free ends and a clamping screw such as shown at 6 secured in place so that the shaft 5 may be rigidly clamped to the base member 1 in any adjusted oblique position.

The angle member 10 is suitably finished on its upper surface 11 and may be provided with any suitable number or type of T slots 12 for attaching an article to be machined, but if desired, these T slots may be omitted in attachments designed primarily for the inspection of articles in which case the surface 11 would be accurately finished to a perfect plane. Angle member 10 is provided with a projection 13 adapted to fit between the uprights 2 and 3 on the base plate 1 and also is provided with a hole as shown at 14 through which the shaft or pin 5 extends. Preferably the angle member 10 is permanently fastened to the shaft or pin 5 in any suitable manner, as by means of taper pins such as shown at 15 or in any other suitable manner. It will be seen from the above that a simple and rugged construction has been provided permitting tilting or adjusting the angle plate 10 about the base 1 to any desired angle and securely clamping it in adjusted position.

In order to accurately determine the angle to which the member 10 has been adjusted the following mechanism has been devised: At one end of the shaft 5 a drum 20 is provided suitably secured thereto by means of a key 21 and held in place by the nut 22 threaded upon the end of shaft 5. The periphery of the drum 20 is accurately ground to a predetermined dimension and is also ground so that it will be accurately concentric with the shaft 5 about which the angle member 10 oscillates.

Mounted directly below the drum 20 in a suitable dove-tailed slot or guideway 30 provided in the base member 1 is a slide 31. The slot 30 is at right angles to the axis of the shaft 5 and, as shown, may be formed in the base member 1 with an adjustable clamping strip 32 at one side. The slide 31 is adjusted to move easily within the groove 30 and is moved by rotation of the drum and tilting of the angle member in the following manner: A flexible strip such as shown at 35 is made fast at one of its ends to a point in the periphery of the drum 20 and at its other end to an extension 36 provided at one end of the slide 31. Another strip or band 40 is similarly fastened to the drum 20 and to another extension to the slide 31 but arranged so that it will be oppositely disposed to the band 35. The bands preferably are made of thin strips of tempered steel and are of uniform thickness and of sufficient flexibility to pass around the drum 20 without undue resistance and without breaking.

The two bands may be suitably tensioned by any convenient means, that shown in Fig. 4 being found suitable for the purpose. In this arrangement the extensions 36 at either end of the slide 31 and to which the bands 35 and 40 are attached may be forced away from the slide 31 by means of the screw 50 pressing against a pin 51 provided on the member 36 and extending partly through the slide 31. The extension members 36 are provided at both ends of the slide 31 to each of which one of the flexible bands 35 or 40 is attached. By forcing one of the projections 36 away from the slide 31 by adjustment of one of the screws 50 both bands will be equally tightened. I prefer, however, to utilize the projections 36 at both ends of the slide 31 so that the construction will be symmetrical, and by relatively adjusting both projections 36 the slide 31 may be positioned along the guideway 30 for a purpose presently to be described. From the above description it will be seen that a definite movement of the slide 31 will indicate a definite angular movement of the angle member 10, the movement of each being proportional to the other no matter at what position relative to the base this movement of the angle member takes place.

In order to conveniently measure the movement of the slide 31 relative to a fixed point in the base plate a plug 60 is rigidly secured to a part of the base member 1 in any convenient manner. In the construction shown an upright support 61 is attached to the base member 1 through which the plug 60 extends. Mounted on the slide 31 is another plug 65 preferably of the same diameter and lying in an axis parallel to the pin 60. It will be seen, therefore, that the arrangement of the plugs is such that the distance between the plug 60 and 65 may be determined with a high degree of precision either by applying a micrometer to enclose the plugs or by inserting precision blocks between the two plugs, either method being equally convenient and well adapted to indicate the movement of the slide 31 relative to the plug 60, allowance being made, of course, for the diameters of the plugs.

The top surface of the slide 31 and the bottom of the drum 20 are spaced apart just sufficient to allow for the thickness of the bands 35 and 40. Otherwise movement outwardly of the slide 31 would produce an angular movement of the bands which would affect the accuracy of the readings.

With the angle member 10 adjusted to its zero or horizontal position by means of an accurate indicator or by any other convenient method the distance between the plugs 60 and 65 is determined. This will be the initial or zero reading of the slide. Movement of one degree or more of the angle member will be indicated by a definite movement of the slide 31 dependent solely upon the diameter of the drum 20 and thickness of the bands 35 and 40. By knowing the diameter of the drum 20 and the distance apart of the pins when the angle member is in its zero position the distance between the plugs 60 and 65 may be readily calculated for any desired oblique position of the member 10.

To facilitate the reading of the angle to which the angle member 10 is set the slide 31 is preferably adjusted by means of the adjusting screws 50 so that when the angle member 10 is in its zero or initial position the distance enclosed by the plugs 60 and 65 is a simple or unitary dimension such as one inch, or 25 millimeters. Furthermore, the diameter of the drum 20, is chosen so that movement of one degree of the angle member 10 will cause a movement of the slide a distance readily calipered or micrometered. This permits the operator to quickly determine the distance between the plugs 60 and 65 for any desired angle of the angle member 10 and to promptly set his micrometer or precision blocks to correspond to this dimension. Should it be desired to use the device for precision angles within limits of small fractions of degrees, a complete table may be prepared indicating at a glance the distance between the plugs 60 and 65 for every desired angle.

The above described method of reading the oblique position of the angle member 10 is independent of a dial and pointer, the accuracy of which is determined by the accuracy with which each of the lines is located and also the accuracy with which it may be read is determined by the width of the lines or graduations and by the degree of accuracy with which the graduations are aligned with the pointer or zero line. In the present construction the accuracy of the reading is determined entirely by the care with which the distance between the plugs 60 and 65 is determined which may be readily done by methods familiar to mechanics such as calipering or fitting precision gage blocks between the plugs.

A convenient method of using the angle attachment is to first determine by calculation or from a set of tables previously calculated the distance enclosed by the plugs 60 and 65 for the particular desired angle and then after setting a micrometer to correspond to that distance, adjusting the position of the angle member 10 until the distance between the plugs 60 and 65 corresponds precisely with that micrometer measurement. If desired, the method may be varied by using a set of precision blocks in which the total length of the blocks would be built up to correspond to the calculated distance between the plugs 60 and 65.

With the angle member 10 adjusted in the manner above described it may be securely clamped in that position by means of the clamping screws 6.

To provide means to readily rotate the angle member 10 about the base member to any desired position a small gear 70 may be suitably secured to the shaft 5 by means of a key 71. Below the gear 70 is provided a short hole 72 in the base member adapted to receive a key or wrench 73 having an extension fitting the hole 72 and provided with a plurality of gear teeth 74 adapted to mesh with the gear 70. Rotation of the wrench or key 73 thus serves to very slowly rotate the angle member 10 to any desired position.

What I claim is:

1. A device comprising in combination, a base plate, an angle member mounted thereon, a slide mounted in said base plate, and means connecting said angle member and slide whereby movement of said slide relative to said base plate is proportional to the angular movement of said angle member.

2. A device comprising in combination, a base plate, an angle member mounted thereon, a slide mounted in said base plate and movable transversely therein, and means connecting said angle member and slide whereby movement of said slide relative to said base plate is proportional to the angular movement of said angle member.

3. A device comprising in combination, a base plate, an angle member mounted thereon, a slide mounted in said base plate, and flexible means connecting said angle member and slide whereby movement of said slide relative to said base plate is proportional to the angular movement of said angle member.

4. A device comprising in combination, a base plate, an angle member rotatably mounted thereon, a slide mounted in said base plate, a drum mounted about the axis on which the angle member rotates, and means connecting said drum and slide whereby the angular movement of said angle member will cause a proportionate movement of said slide.

5. A device comprising in combination, a base plate, an angle member rotatably mounted thereon, a slide mounted in said base plate, a drum mounted about the axis on which the angle member rotates, and flexible means connecting said drum and slide whereby the angular movement of said angle member will cause a proportionate movement of said slide.

6. A device comprising in combination, a base plate, an angle member rotatably mounted thereon, a slide mounted in said base plate, a drum mounted about the axis on which the angle member rotates, and oppositely disposed flexible means connecting said drum and slide whereby the angular movement of said angle member will cause a proportionate movement of said slide.

7. A device comprising in combination, a base plate, an angle member rotatably mounted thereon, a slide mounted in said base plate, a drum mounted about the axis on which the angle member rotates, flexible means connecting said drum and slide whereby the angular movement of said angle member will cause a proportionate movement of said slide, and means permitting adjustment of said flexible means.

8. A device comprising in combination, a base plate, an angle member rotatably mounted thereon, a drum coaxially mounted with said angle member, a slide mounted transversely in said base plate, flexible means connecting said drum and slide, and means associated with said base plate and slide whereby the extent of movement of said slide relative to the base plate may be determined.

9. A device comprising in combination, a base plate, an angle member rotatably mounted thereon, a drum coaxially mounted with said angle member, a slide mounted transversely in said base plate, flexible means connecting said drum and slide, means permitting adjustment of said flexible means, and means associated with said base plate and slide whereby the extent of movement of said slide relative to the base plate may be determined.

10. A device comprising in combination, a base plate, an angle member mounted thereon, a slide mounted in said base member, means connecting said angle member and slide whereby movement of said slide is proportional to the angular movement of said angle member, and indicating means on said base member and slide whereby the extent of movement of said slide relative to the base plate may be determined.

11. A device comprising in combination, a base plate, an angle member mounted thereon, a slide mounted in said base member, means connecting said angle member and slide whereby movement of said slide is proportionate to the angular movement of said angle member, a plug mounted in said base, and a plug mounted in said slide parallel to said first mentioned plug whereby the extent of movement of said slide relative to said base plate may be determined.

12. A device comprising in combination, a base plate, an angle member rotatably mounted thereon, a slide mounted in said base member, means connecting said angle member and slide whereby the extent of linear movement of said slide will determine the extent of angular movement of said angle member, means for rotating said angle member relative to the base plate, and means for clamping said angle member in any adjusted position.

13. A device comprising in combination, a base plate, an angle member rotatably mounted thereon, a slide mounted in said base member, means connecting said angle member and slide whereby the extent of linear movement of said slide will determine the extent of angular movement of said angle member, means for adjusting said connecting means, means for rotating said angle member relative to the base plate, and means for clamping said angle member in any adjusted position.

14. A device comprising in combination, a base plate, an angle member rotatably mounted thereon, a slide mounted in said base member, means comprising a drum and a pair of oppositely disposed flexible bands connecting said angle member and slide whereby the extent of linear movement of said slide will determine the extent of angular movement of said angle member, means for rotating said angle member relative to the base plate, and means for clamping said angle member in any adjusted position.

15. A device comprising in combination, a base plate, an angle member rotatably mounted thereon, a slide mounted transversely to the axis of rotation of said angle block in said base member, means connecting said angle member and slide whereby the extent of linear movement of said slide will determine the extent of angular movement of said angle member, means for rotating said angle member relative to the base plate, and means for clamping said angle member in any adjusted position.

16. A device comprising in combination, a base plate, an angle member mounted thereon, a slide mounted in said base plate, means connecting said angle member and slide, and means to initially position said slide relative to said base plate.

17. A device comprising in combination, a base plate, an angle member rotatably mounted thereon, a slide mounted in said base plate, a drum mounted about the axis on which the angle member rotates, flexible means connecting said drum and slide whereby angular movement of said angle member will cause a proportionate movement of said slide, and means to adjustably secure the flexible means to said slide.

18. A device comprising in combination, a base plate, an angle member rotatably mounted thereon, a slide mounted in said base plate, a drum mounted about the axis on which the angle member rotates, flexible means connecting said drum and slide whereby angular movement of said angle member will cause a proportionate movement of said slide, and means to independently adjust the flexible means at either end of the slide.

19. A device comprising in combination, a base plate, an angle member mounted thereon, a slide mounted in said base plate, means connecting said angle member and slide, and means to initially position said slide whereby the position of said slide relative to a fixed point in said base plate may be adjusted to an integral number of units of length.

20. A device comprising in combination, a base plate, an angle member rotatably mounted thereon, a drum coaxially mounted with said angle member, a slide mounted transversely in said base plate, flexible means connecting said drum and slide, and means associated with said base plate and slide whereby the extent of movement of said slide relative to the base plate may be determined, the linear movement of the slide and the angular movement of the angle member being related to each other by a multiple.

21. A device comprising in combination, a base plate, an angle member rotatably mounted thereon, a drum coaxially mounted with said angle member, a slide mounted transversely in said base plate, flexible means connecting said drum and slide, and means associated with said base plate and slide whereby the extent of movement of said slide relative to the base plate may be determined, the linear movement of the slide and the angular movement of the angle member being related to each other by a constant multiple throughout the range of movement of said angle member.

22. A device comprising in combination, a base plate, an angle member rotatably mounted thereon, a slide mounted in said base plate, a drum mounted about the axis on which the angle member rotates, and means connecting said drum and slide whereby the angular movement of said angle member will cause a proportionate movement of said slide, the angular movement of the angle member through a unit arc being indicated by a movement of the slide equal to a convenient measuring unit.

23. A device comprising in combination, a base plate, an angle member mounted thereon, a slide mounted in said base plate, and means connecting said angle member and slide whereby movement of said slide relative to said base plate is proportional to the angular movement of said angle member, the angular movement of the angle member through a unit arc being indicated by a movement of the slide equal to a convenient measuring unit.

In testimony whereof, I hereto affix my signature.

WILLIAM H. WEINGAR.